(12) United States Patent
Fujimaki

(10) Patent No.: US 8,589,397 B2
(45) Date of Patent: Nov. 19, 2013

(54) DATA CLASSIFICATION METHOD AND DATA CLASSIFICATION DEVICE

(75) Inventor: Ryohei Fujimaki, Tokyo (JP)

(73) Assignee: NEC Corporation, Tokyo (JP)

( * ) Notice: Subject to any disclaimer, the term of this patent is extended or adjusted under 35 U.S.C. 154(b) by 256 days.

(21) Appl. No.: 12/733,895

(22) PCT Filed: Apr. 21, 2008

(86) PCT No.: PCT/JP2008/057705
§ 371 (c)(1),
(2), (4) Date: Mar. 26, 2010

(87) PCT Pub. No.: WO2009/041101
PCT Pub. Date: Apr. 2, 2009

(65) Prior Publication Data
US 2010/0250542 A1    Sep. 30, 2010

(30) Foreign Application Priority Data

Sep. 28, 2007    (JP) .................................. 2007-253703

(51) Int. Cl.
*G06F 17/30* (2006.01)
(52) U.S. Cl.
USPC ........................................................ 707/737
(58) Field of Classification Search
USPC ........................................................ 707/737
See application file for complete search history.

(56) References Cited

U.S. PATENT DOCUMENTS

| | | | |
|---|---|---|---|
| 6,219,658 B1 * | 4/2001 | Gordon | 706/15 |
| 6,327,581 B1 * | 12/2001 | Platt | 706/12 |
| 7,406,450 B2 | 7/2008 | Graf et al. | |
| 7,587,069 B2 * | 9/2009 | Movellan et al. | 382/118 |
| 2003/0093393 A1 * | 5/2003 | Mangasarian et al. | 706/16 |
| 2003/0115189 A1 * | 6/2003 | Srinivasa et al. | 707/3 |
| 2004/0205482 A1 * | 10/2004 | Basu et al. | 715/500.1 |

(Continued)

FOREIGN PATENT DOCUMENTS

| | | |
|---|---|---|
| JP | 2005-345154 A | 12/2005 |
| JP | 2007-052507 A | 3/2007 |
| JP | 2007-095069 A | 4/2007 |
| JP | 2007-115245 A | 5/2007 |

OTHER PUBLICATIONS

Filippone et al., Possibilistic Clustering in Feature Space, 2007.*

(Continued)

*Primary Examiner* — William Spieler
(74) *Attorney, Agent, or Firm* — McGinn Intellectual Property Law Group, PLLC

(57) ABSTRACT

A separation surface set storage part stores information defining a plurality of separation surfaces which separate a feature space into at least one known class region respectively corresponding to at least one known class and an unknown class region. Each of the at least one known class region is separated from outside region by more than one of the plurality of separation surfaces which do not intersect to each other. A data classification apparatus determine a classification of a classification target data whose inner product in the feature space is calculable by calculating to which region of the at least one known class region and the unknown class region determined by the information stored in the separation surface set storage part the classification target data belongs. A method and apparatus for data classification which can simultaneously perform identification and outlying value classification with high reliability in a same procedure are provided.

17 Claims, 12 Drawing Sheets

(56) References Cited

U.S. PATENT DOCUMENTS

2005/0102246 A1* 5/2005 Movellan et al. ............ 706/12
2007/0150954 A1* 6/2007 Shon ............................ 726/23
2007/0168305 A1 7/2007 Vapnik et al.
2007/0239638 A1* 10/2007 Zhuang et al. ................ 706/20

OTHER PUBLICATIONS

Perwass, C., Banarer, V., & Sommer, G. (2003). Spherical decision surfaces using conformal modelling. In Pattern Recognition (pp. 9-16). Springer Berlin Heidelberg.*

Ioannis Tsochantaridis, Thorsten Joachims, Thomas Hofmann, Yasemin Altun. "Large Margin Methods for Structured and Interdependent Output Variables". Journal of Machine Learning Research, vol. 6: pp. 915-936. 2003.

Bernhard Scholkopf and Alex Smola. Learning with Kernels: Support Vector Machines, Regularization, Optimization and Beyond. MIT Press. pp. 230-233. 2002.

Bernhard Scholkopf, Alex J. Smola, Robert C. Williamson and Peter L. Bartlett. New Support Vector Algorithms. Neural Computation. vol. 12: pp. 1207-1245. 2000.

Yasuto Takahata, "1 Class SVM to Kinbo Support ni yoru Ryoiki Hanbetsu", Keisei no Kagaku Operations Research, vol. 51, No. 11, Nov. 1, 2006.

A.L. Yuille and A. Rangarajan. The concave-convex procedure. Neural Computation. vol. 15, No. 4, pp. 915-936, Apr. 2003.

* cited by examiner

Fig. 4

| HYPERPLANE NUMBER | $W_1$ | ... | $W_M$ | b |
|---|---|---|---|---|
| HYPERPLANE A | $W_1^A$ | ... | $W_M^A$ | $b^A$ |
| HYPERPLANE B | $W_1^B$ | ... | $W_M^B$ | $b^B$ |
| HYPERPLANE C | $W_1^C$ | ... | $W_M^C$ | $b^C$ |
| HYPERPLANE D | $W_1^D$ | ... | $W_M^D$ | $b^D$ |

Fig. 5

| HYPERSPHERE NUMBER | $W_1$ | ... | $W_M$ | r |
|---|---|---|---|---|
| HYPERSPHERE E | $W_1^E$ | ... | $W_M^E$ | $r^E$ |
| HYPERSPHERE F | $W_1^F$ | ... | $W_M^F$ | $r^F$ |
| HYPERSPHERE G | $W_1^G$ | ... | $W_M^G$ | $r^G$ |
| HYPERSPHERE H | $W_1^H$ | ... | $W_M^H$ | $r^H$ |

DATA CLASSIFICATION METHOD AND DATA CLASSIFICATION DEVICE

TECHNICAL FIELD

The present invention relates to a data classification method and a data classification device, in particular, a data classification method and a data classification device which can simultaneously classify known class and an outlying value by using a plurality of separation surfaces. This application is based on Japanese Patent Application No. 2007-253703 which was filed on Sep. 28, 2007 and disclosure of which is hereby incorporated by reference.

BACKGROUND ART

Data classification is a technique for estimating a class to which given unclassified data belongs, which is one of most basic components in data analysis. In particular, a data classification technique using a separation surface which divides a feature space into a plurality of regions, such as a separation surface between classes has high capability of representing a model. For this reason, the technique can be applied to wide range of problems and data structures including data classification of image data, protein and gene data, and even can be applied to: failure diagnosis in a case where the class label is set to be information about failure; and link presumption in a case where the class label is set to be the presence/absence of link between networks such as the Internet or social networks.

The data classification method using a separation surface is broadly categorized into two techniques, namely, the identification and the outlying value classification. In the former one, by learning a separation surface for separating classes based on data having a class label, classification target data is classified into known classes. In the latter one, by regarding training data as one class and learning a separation surface for separating a region where the training data is distributed from the other region, it is judged that the classification target data belongs to the class or not. As the data classification method capable of simultaneously performing identification and outlying value classification, some combinations of data classification methods using the separation surface can be easily inferred.

First, in a case where the number of the class regarding to the training data is one, data classification is outlying value classification. Thus, use of a known outlying value classification technique such as 1 class support vector machine (Chapter 8 of Document 5, and Document 3) is considered.

Next, in a case where the number of classes regarding to the training data is two or more, the following method can be adopted: outlying value classification such as the 1 class support vector machine is independently learnt for each class. When classification target data is determined as an outlying value to all classes, the data is an outlying value and when the classification target data is determined to belong to one or a plurality of classes, the data is classified into the one or the plurality of classes.

In the case where the number of the class regarding to the training data is two or more, another method can be adopted. An outlying value classification method such as the 1 class support vector machine is combined with a identification method using a separation surface such as the support vector machine (Document 1, Document 2, and Document 6). First, all of classes are learnt by the outlying value classification method and then, identification is made for known classes. According to this method, it is determined whether classification target data is an outlying value by an outlying value detection method, and when the data is not an outlying value, it is determined which of known classes the data belongs to by the identification method.

On the other hand, as a technique using a plurality of separation surfaces, the multi-class support vector machine is exemplified. As the method for implementing the multi-class support vector machine, there are a method of calculating 2 class support vector machine for each combination of classes and taking a majority vote and a method of simultaneously optimizing a plurality of hyperspaces such as methods proposed in Document 7 and Document 4.

Related documents are listed below.

Document 1: Japanese Unexamined Patent Publication No. 2007-115245
Document 2: Japanese Unexamined Patent Publication No. 2007-95069
Document 3: Japanese Unexamined Patent Publication No. 2005-345154
Document 4: Japanese Unexamined Patent Publication No. 2007-52507
Document 5: Bernhard Scholkopf and Alex Smola. Learning with Kernels, Support Vector Machines, Regularization, Optimization and Beyond. MIT Press. 2002.
Document 6: Bernhard Scholkopf, Alex J. Smola, Robert C. Williamson and Peter L. Bartlett. New Support Vector Algorithms. Neural Computation. Vol. 12: page 1207-1245, 2000.
Document 7: Ioannis Tsochantaridis, Thorsten, Joachims, Thoms Hofmann, Yasemin Altun. Large Margin Methods for Structured and Interdependent Output Variables, Journal of Machine Learning Research Vol 6: page 1453-1484, 2005.
Document 8: A. L. Yuille and A. Rangarajan. The concave-convex procedure. Neural Computation. Vol 15: page 915-936, 2003.

DISCLOSURE OF INVENTION

A conventional data classification method of simultaneously performing the identification and the outlying value classification involve following problems.

First, in a case where, data is classified using a single separation surface such as in the 1 class support vector machine and the support vector machine, since only a boundary surface on one side of data is considered and a boundary surface on the opposite side is neglected, classification becomes disadvantageously optimistic.

The reason is that, as shown in FIG. 18, in a 1 class support vector machine using a separation hyperplane (also merely referred to as a hyperplane), only one side separation boundary of data is considered and a separation boundary on another side is not considered. Furthermore, as shown in FIG. 19, in a 1 class support vector machine using a separation hypersphere (also merely referred to as the hypersphere), only an outer side separation boundary of data is considered and a separation boundary on an inner side of data is not considered. This problem is common to other kinds of known data classification devices applying a separation surface.

Further, in a case where a combination of known data classification techniques respectively using a separation surface is used, there is a problem that the reliability of an accuracy of data classification is dropped.

The reason is that, when some of the outlying value classifications for classes are combined with each other, since each class is independently considered, the relationships between the classes are not considered. In a case where outlying value classification is combined with identification, since different classes are regarded as 1 class, an accuracy of the outlying value classification is dropped. In cases where any combination other than the above-mentioned combinations is used, this problem may occur.

When these known techniques are combined, a plurality of separation surfaces are used. However, since the surfaces are independently calculated and used, the use of the plurality of separation surfaces is equivalent to a use of single separation surface.

Furthermore, in a conventional data classification method using a separation surface, since there is no concept of simultaneous performing the outlying value classification and the identification, disadvantageously, the outlying value classification and the identification cannot be performed at the same time in a same module.

In addition, in a case of the multi-class support vector machine using a plurality of separation surfaces, there is a problem that the outlying value classification cannot be performed.

The reason is that, in a multi-class support vector machine, only separation surfaces for classifying known classes is considered and a boundary between an unknown class and a known class is not considered. In other words, the known class is adjacent to another known class across one separation surface and there is no concept that there may be an unknown class interposed between the known classes.

An object of the present invention is to provide a data classification method and a data classification device which can simultaneously perform identification and outlying value classification with high reliability in a same procedure.

A data classification apparatus according to an exemplary embodiment of the present invention includes a separation surface set storage part configured to store information defining a plurality of separation surfaces which separate a feature space into at least one known class region respectively corresponding to at least one known class and an unknown class region. Each of the at least one known class region is separated from outside region by more than one of the plurality of separation surfaces which do not intersect to each other. The data classification apparatus further includes a classification part configured to determine a classification of a classification target data whose inner product in the feature space is calculable by calculating to which region of the at least one known class region and the unknown class region determined by the information stored in the separation surface set storage part the classification target data belongs.

A data classification method according to an exemplary embodiment of the present invention includes: (a) inputting classification target data whose inner product in a feature space is calculable; and (b) inputting a plurality of separation surfaces which separate the feature space into at least one known class region respectively corresponding to at least one known class and an unknown class region from a separation surface set storage part. Each of the at least one known class region is separated from outside region by more than one of the plurality of separation surfaces which do not intersect to each other. The data classification method further includes (c) classifying the classification target data by calculating to which region of the at least one known class region and the unknown class region the classification target data belongs.

A separation surface set calculation apparatus according to an exemplary embodiment of the present invention includes: a training data storage part configured to store a plurality of training data whose inner product in a feature space is calculable and respectively classified into any of at least one known class; and a separation surface set calculation part configured to calculate a plurality of separation surfaces which separate the feature space into at least one known class region respectively corresponding to the at least one known class and an unknown class region, based on: the plurality of training data stored in the training data storage part; and a classification of each of the plurality of training data. Each of the at least one known class region is separated from outside region by more than one of the plurality of separation surfaces which do not intersect to each other. The separation surface set calculation apparatus further includes a separation surface set storage part configured to store information defining the plurality of separation surfaces.

A program according to an exemplary embodiment of the present invention makes a computer execute a method including the following (a) to (c).
(a) Inputting classification target data whose inner product in a feature space is calculable.
(b) Inputting a plurality of separation surfaces which separate the feature space into at least one known class region respectively corresponding to at least one known class and an unknown class region from a separation surface set storage part. Each of the at least one known class region is separated from outside region by more than one of the plurality of separation surfaces which do not intersect to each other.
(c) Classifying the classification target data by calculating to which region of the at least one known class region and the unknown class region the classification target data belongs.

A program according to an exemplary embodiment of the present invention makes a computer execute a method including the following (a) to (c).
(a) Storing a plurality of training data whose inner product in a feature space is calculable and respectively classified into any of at least one known class.
(b) Calculating a plurality of separation surfaces which separate the feature space into at least one known class region respectively corresponding to the at least one known class and an unknown class region, based on: the plurality of training data stored in the training data storage part; and a classification of each of the plurality of training data. Each of the at least one known class region is separated from outside region by more than one of the plurality of separation surfaces which do not intersect to each other.
(c) Storing information defining the plurality of separation surfaces.

According to the present invention, identification and outlying value classification can be simultaneously performed by a same procedure with high reliability. The reason why identification and outlying value classification can be simultaneously performed by the same procedure is as follows. On a basis of a plurality of training data in a feature space whose inner product can be calculated and being classified into one or more known classes and the classification of the plurality of training data, the plurality of separation surfaces are calculated. The plurality of separation surfaces separate the feature space into one or more known class regions corresponding to one or more known class regions and an unknown class region. And the plurality of separation surfaces are two or more per each class and not intersecting to each other. In classifying unclassified classification target data whose inner product can be calculated in the feature space, by calculating which region in the feature space, which is separated into one or more class regions and the other unknown class region by the plurality of separation surfaces, the classification target data belongs to, classification of the classification target data is determined. The reason why data classification can be performed with high reliability is that, since the boundary of each known class is defined by two or more separation surfaces, reliability of data classification is enhanced as compared to a case where the boundary is defined by a single separation surface.

BRIEF DESCRIPTION OF DRAWINGS

FIG. 4 is an example of a method of storing data defining hyperplanes according to a first exemplary embodiment of the present invention;

FIG. 5 is an example of a method of storing data defining hyperspheres according to a first exemplary embodiment of the present invention;

BEST MODE FOR CARRYING OUT THE INVENTION

Next, exemplary embodiments of the present invention will be described in detail referring to figures.

[First Exemplary Embodiment]

Figure 1:
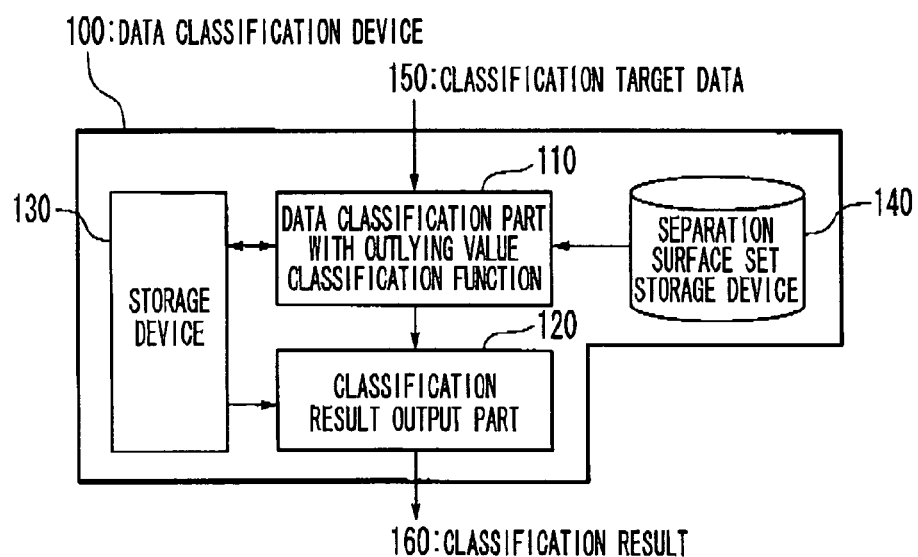
FIG. 1 is a black diagram showing a configuration of a data classification device according to a first exemplary embodiment of the present invention.

Referring to FIG. 1, a data classification device 100 according to a first exemplary embodiment of the present invention has a data classification part with outlying value classification function 110, a classification result output part 120, a storage device 130 and a separation surface set storage device 140. The data classification device 100 can be embodied with a computer such as a personal computer. In this case, the data classification part with outlying value classification function 110 and the classification result output part 120 are realized by reading a program stored in a storage device by a processor such as a CPU and performing operations according to the procedure described in the program.

The Data classification device inputs classification target data 150 and calculates which region in a feature space the classification target data 150 belongs to, wherein the feature space is separated into one or more class regions (known class region) and the other unknown region with a plurality of separation surfaces. By this calculation, the data classification device 100 estimates which of known classes or outlying value the classification target data 150 is classified into and outputs the estimation result as a classification result 160.

The classification target data 150 is unclassified vector data. The number of attributes included in the classification target data 150 is defined as d and the classification target data 150 is represented as d-dimensional vector as in formula (1). In formula (1), a symbol ' added to a top right of a right parenthesis represents transposition (a symbol $T$ may be used in place of the symbol '). $x^j$ represents the j-th attribute of the classification target data 150 and may be either a real number or a symbol number. A map from x to the feature space is represented as $\phi$ and the image of x in the feature space is represented as $\phi(x)$. In the following description, the classification target data may refer to the classification target data or the image thereof in the feature space.

$$x=(x^1, \ldots, x^j, \ldots, x^d)' \qquad (1)$$

Figure 2:
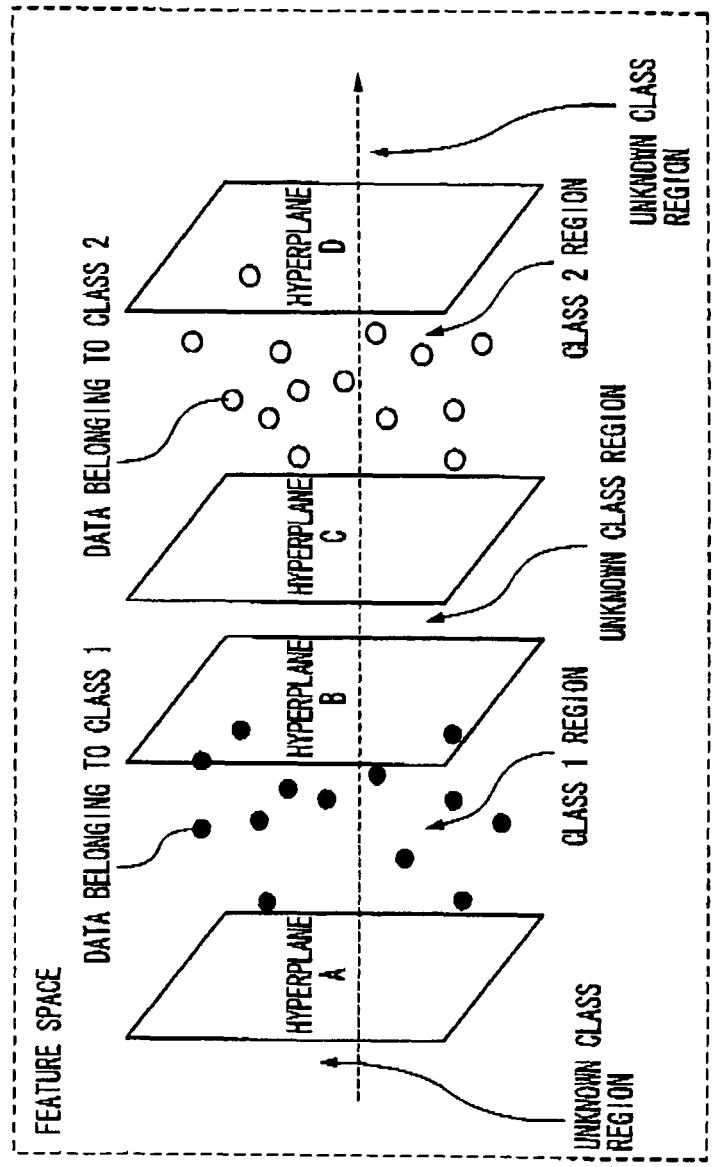
FIG. 2 is an example of data classification using hyperplanes according to a first exemplary embodiment of the present invention.
Figure 3:
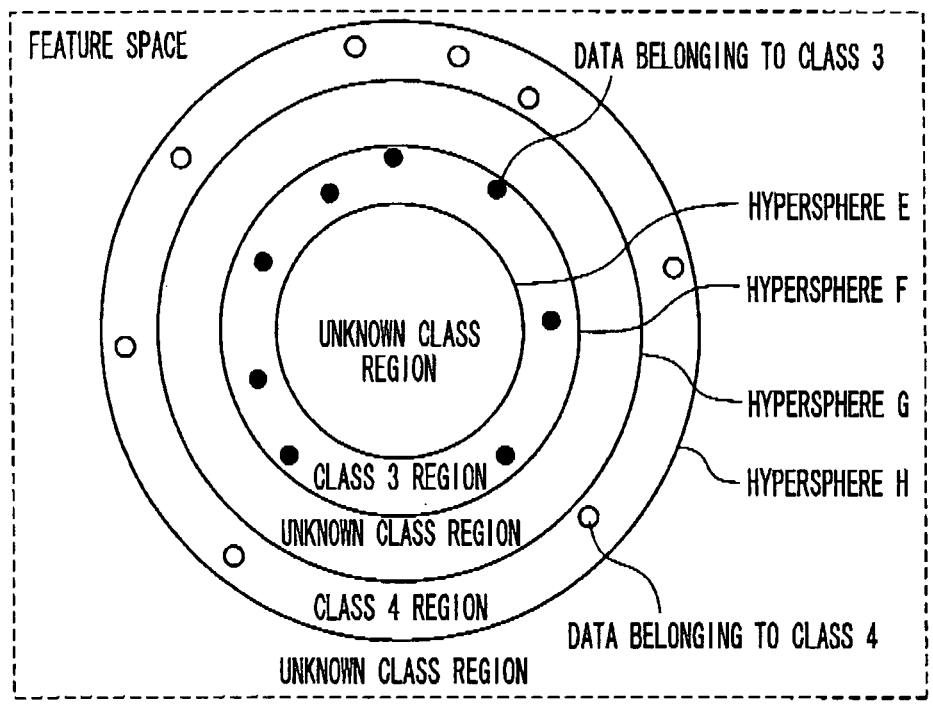
FIG. 3 is an example of data classification using hyperspheres in accordance with the first exemplary embodiment of the present invention.

The separation surface set storage device 140 stores information defining a plurality of separation surfaces which separate the feature space into one or more class regions corresponding to one or more known classes and the other unknown class region. The separation surface may form a flat surface in the feature space like hyperplanes A to D shown in FIG. 2 or may form a spherical surface in the feature space like hyperspheres E to H shown in FIG. 3. Alternately, the separation surface may be a hyper-cylindrical surface or a hyper-conical surface. However, similarly to the hyperplanes A to D which are parallel to one another shown in FIG. 2 and the concentric hyperspheres E to H in FIG. 3, it is necessary that the plurality of separation surfaces do not intersect to each other. In FIG. 2, the boundary of a region for a class 1 is defined by two hyperplanes A and B, the boundary of a region for a class 2 is defined by two hyperplanes C and D. In FIG. 3, the boundary of a region for a class 3 is defined by two hyperplanes E and F and the boundary of a region for a class 4 is defined by two hyperplanes G and H. In this manner, the boundary of each known class is defined by two or more separation surfaces per known classes.

The information stored in the separation surface set storage device 140 may be any information as long as it identifies the separation surfaces. For example, given that an i-th basis function of the feature space is represented by $\psi i$, it is possible to describe a separation surface in the feature space by using the basis function. For example, in a case where the separation surface is a hyperplane represented as $\Sigma w_i \psi i \phi(x) + b = 0$, basis $\psi i$, weight $w_i$ of the basis and intercept b are stored as information defining the hyperplane. At this time, since the basis ψi is common to all hyperplanes, for example, as shown in FIG. 4, it is possible that the weight wi and the intercept b are stored for each hyperplane in the form of a table and the basis ψi is commonly stored. In a case of a hypersphere, given that the center is c and the radius is r, the hypersphere is represented as $|\phi(x)-c|^2=r$, and the center c is a point located within the feature space so that it can be represented by $c=\Sigma w_i \psi i$. Thus, as shown in FIG. 5, it is possible that the weight $w_1$ and the radius r are stored for each hypersphere in the form of a table and the basis ψi is commonly stored. Although any basis function can be used as the basis function, for example, the basis in an element space of x and the kernel function can be used as frequently used basis. In this case, it is assumed that the inner product of bases is defined (the kernel function means a function which provides an inner product of any basis function satisfying certain conditions).

The storage device 130 stores rules for classifying the classification target data 150 based on positional relationship between the classification target data 150 and the plurality of separation surfaces stored in the separation surface set storage device 140. For example, when data is classified by using a plurality of hyperplanes as shown in FIG. 2, the storage device 130 stores rules, for example, "a negative direction from the hyperplane A→→→ classified into outlying value, "and" a positive direction from the hyperplane C and in a negative direction from the hyperplane D→ classified into the class 2" therein. As shown in FIG. 3, when data is classified by using a plurality of hyperspheres, the storage device 130 stores rules, for example, "inner side from the hypersphere E→ classified into outlying value," and "outer side from the hypersphere G and inner side from the hypersphere H→ classified into the class 4" therein. Although the above examples describe cases of hyperplane and hypersphere, the separation surface is not limited to them. A hyper-curved plane in another shape can be adopted. Alternatively, separation surfaces of different types can be combined. The storage device 130 may store a classification result determined by the data classification part with outlying value classification function 110 therein.

The data classification part with outlying value classification function 110 reads the classification target data 150 and information of the plurality of separation surfaces stored in the separation surface set storage device 140 and calculates a positional relationship between the classification target data 150 and the plurality of separation surfaces. As described above, the separation surfaces are, for example, hyperplanes, hyperspheres, hyper-cylindrical planes and hyper-curved planes. The positional relationship indicates that, in a case of the hyperplane, whether data is located on the hyperplane, on a positive side from the hyperplane or on a negative side from the hyperplane, and in a case of the hypersphere, whether data is located on the hypersphere, on the inner side of the hypersphere or the outer side from the hypersphere. As described above, rules for classifying data based on the positional relationship are stored in the storage device 130 and the data classification part with outlying value classification function 110 classifies data by using the positional relationship and the classification rules.

The classification result output part 120 receives a classification result determined by the data classification part with outlying value classification function 110 directly from the data classification part with outlying value classification function 110 or reads the classification result stored in the storage device 130 and outputs the classification result. An output destination may be an output device such as a display connected to the data classification device 100 or an output device or a terminal device connected to the data classification device 100 via a network.

Next, whole operations of the data classification device according to this exemplary embodiment will be described.

Figure 6:
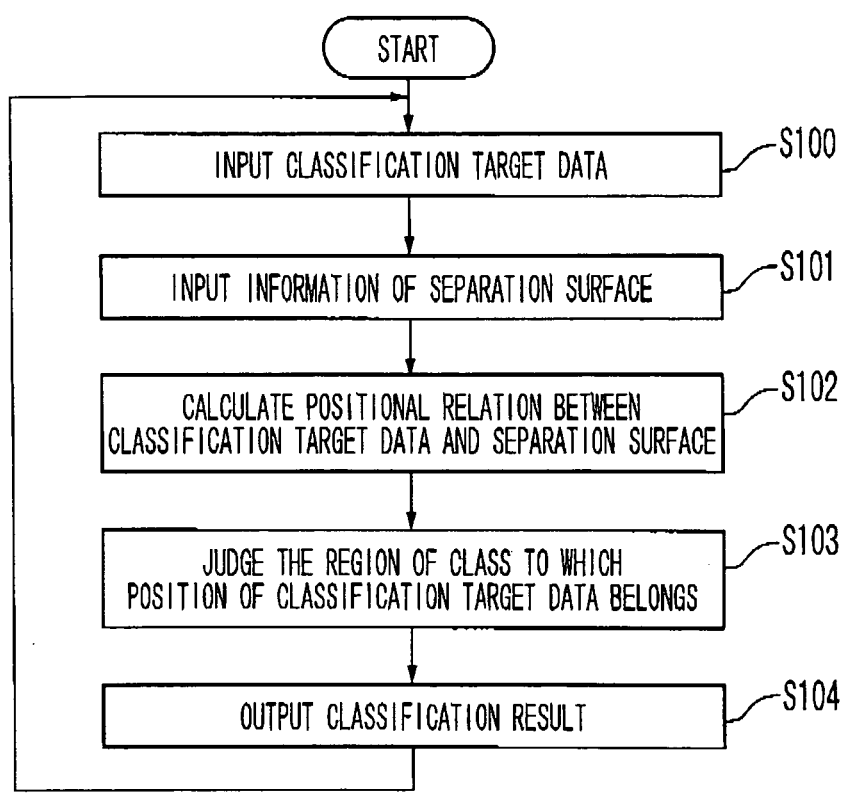
FIG. 6 is a flow chart showing an example of processing of a data classification device according to a first exemplary embodiment of the present invention.

Referring to FIG. 6, the data classification part with outlying value classification function 110 of the data classification device 100 inputs the classification target data 150 including d attributes (S100) and information of the plurality of separation surfaces from the separation surface set storage device 150 (S101).

Next, the data classification part with outlying value classification function 110 calculates a positional relationship between the classification target data 150 and the plurality of separation surfaces by using the input classification target data 150 and information of the plurality of separation surfaces (S102). Using the hyperplane A in FIG. 2 and FIG. 4 as an example, with respect to data x, by performing a calculation: $\Sigma w_1^A \psi i \phi(x)+b^A$, a positional relationship can be determined depending on the value (values 0, positive, negative are classified into positions on the hyperplane A, on a positive side from the hyperplane A, on a negative side from the hyperplane A, respectively). Also in the case of the hypersphere E in FIG. 3 and FIG. 5, a positional relationship can be determined (cases where $|\phi(x)-\Sigma w_i^E \psi i|^2$ with respect to the data x is equal to $r^E$, larger than $r^E$ and smaller than $r^E$ are classified into positions on the hypersphere E, on an outer side from the hypersphere E, on an inner side from the hypersphere E, respectively).

Next, the data classification part with outlying value classification function 110 reads classification rules stored in the storage device 130 and determines which class the classification target data 150 belongs to (S103). Then, the classification result output part 120 outputs a classification result of the data classification part with outlying value classification function 110 (S104).

Concerning data classification, the number of known classes is one or more. When the number is 1, it functions as a data classification device for performing outlying value classification.

Next, effects of this exemplary embodiment will be described.

In this exemplary embodiment, identification and outlying value classification can be performed simultaneously in a same procedure. The reason is as follows. A positional relationship between the plurality of separation surfaces and the classification target data 150 is calculated, wherein the separation surfaces separate the feature space into one or more class regions corresponding to one or more known classes and the other unknown class region. And then, by calculating which region of one or more class regions and the other unknown class region the classification target data 150 belongs to, the classification target data 150 is classified.

Furthermore, in this exemplary embodiment, data classification can be performed with high reliability. The reason is that since the boundary of each known class is defined by two or more separation surfaces, reliability of data classification in comparison with the case where the boundary is defined by a single separation surface is enhanced.

[Second Exemplary Embodiment]

Figure 7:
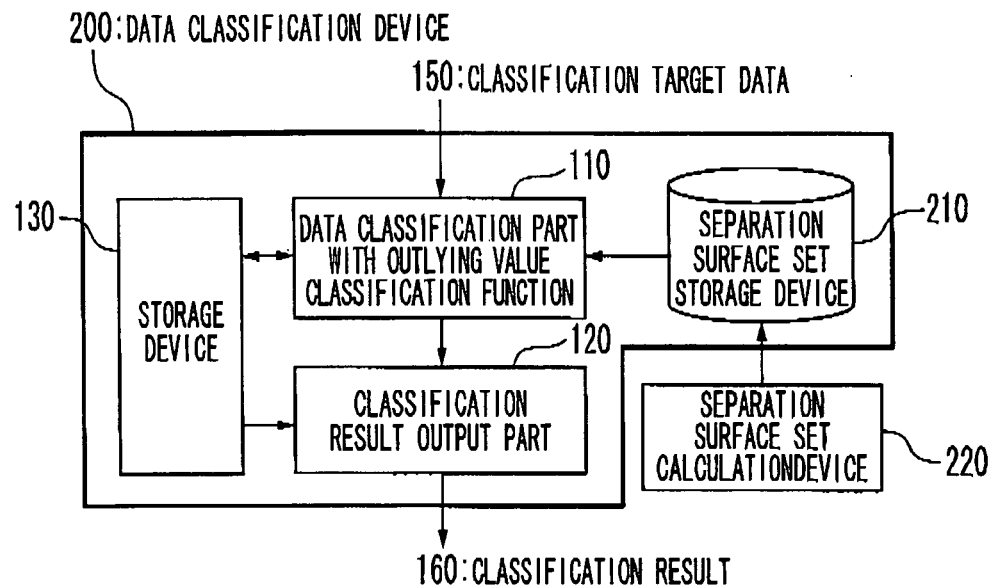
FIG. 7 is a block diagram showing a configuration of a data classification device according to a second exemplary embodiment of the present invention.

Referring to FIG. 7, a data classification device 200 according to a second exemplary embodiment of the present invention is different from the data classification device 100 according to the first exemplary embodiment shown in FIG. 1 in that a separation surface set storage device 210 is provided in place of the separation surface set storage device 140 and a separation surface set calculation device 220 is connected.

The separation surface set calculation device 220 calculates the plurality of separation surfaces on a basis of a plurality of training data classified into one or more known classes and the classification thereof. The plurality of separation surfaces separate the feature space into one or more class regions corresponding to one or more known classes and the other unknown class region. Each of one or more class regions is separated from the other region with two or more of the plurality of separation surfaces which do not intersect to each other. The separation surface set storage device 210 is a device for storing information defining the plurality of separation surfaces calculated by the separation surface set calculation device 220.

Figure 8:
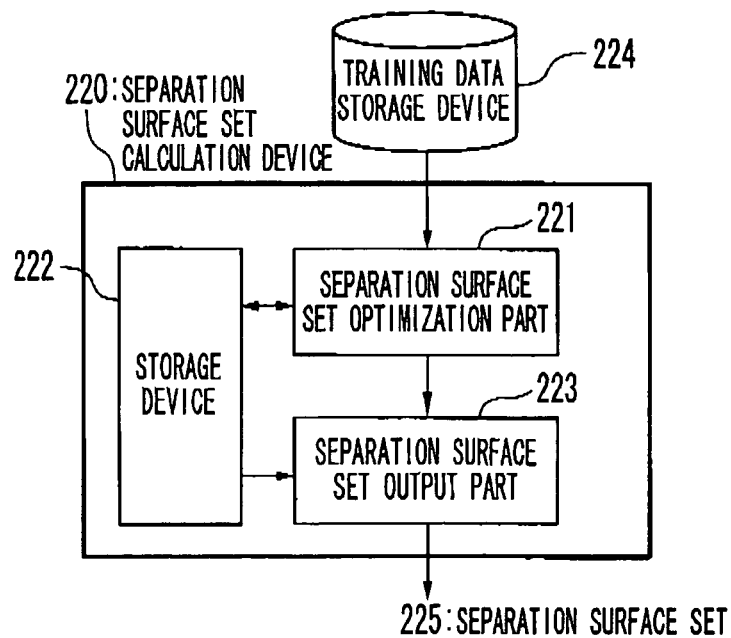
FIG. 8 is a block diagram showing a configuration of a separation surface set calculation device according to a second exemplary embodiment of the present invention.

The separation surface set calculation device 220 has, as shown in FIG. 8, a separation surface set optimization part 221, a storage device 222 and a separation surface set output part 223. The separation surface set optimization part 221 inputs training data from the training data storage device 224. The separation surface set output part 223 outputs optimized separation surface set 225.

The training data storage device 224 stores a set of data $x_i$ having a same attribute as the classification target data 150 and class label $y_i$ to which the data xi belongs therein. Here, it is assumed that i is an index of the training data, N is a predetermined integer and training data is input from i=1, . . . to N.

The separation surface set optimization part 221 calculates the plurality of separation surfaces. By this calculation, the minimization of classification errors with respect to the training data, the minimization of complexity of the separation surface set, and the minimization of the size of each class region are simultaneously optimized. As to the plurality of separation surface to be used, combinations of separation surfaces may be previously stored in the storage device 222 as candidates. For using the plurality of separation surfaces in optimization, these candidates are read from the storage device 222. Alternatively, by optimizing any combination of separation surfaces, an optimum separation surface set may be selected.

Any error can be used as the classification error. For example, the number of wrongly-classified data, square loss regarding to wrongly-classified data, an absolute value loss regarding to wrongly-classified data and a hinge loss to wrongly-classified data.

As a complexity of the separation surface set, any standard of complexity can be used. For example, given that the j-th separation surface is $f_j$, L1 complexity $|f_j|$, L2 complexity $|f_j|^2$, L∞ complexity $|f_j|^\infty$ of $f_j$ may be used. Here, each of the L1 complexity, the L2 complexity, and the L∞ complexity of $f_j$ means an amount representing norm (magnitude) of the function (separation surface). For the vector $v=(v_1, \ldots, v_n)$, the L1 complexity is $\Sigma|v_1|$, the L2 complexity is $\Sigma v_1^2$ and the L∞ complexity is max $|v_1|$.

The size of each class region is, for example, the size of a region sandwiched between the hyperplane and the hyperplane B in the case of the class 1 shown in FIG. 2 or the size of the region sandwiched between the hypersphere E and the hypersphere F in the case of the class 3 shown in FIG. 3. To represent the size, any standard can be used.

Generally, as the complexity of separation surfaces is increased, the classification error to the training data becomes smaller. However, since the training data is excessively learnt, a classification accuracy of unknown classification data is dropped. Therefore, to learn the separation surfaces which minimize the classification error while remaining the complexity of the separation surfaces small, the separation surface set in which the sum of both (and further, the sum of both and the standard of the size of each class region) is the smallest is selected.

Next, operations in this exemplary embodiment will be described.

Operations in this exemplary embodiment is broadly divided into a calculation process of the separation surfaces performed by the separation surface set calculation device 220 and a process of classifying the classification target data 150 by using the calculated separation surfaces.

In the process of calculating the separation surfaces performed by the separation surface set calculation device 220, the separation surface set optimization part 221 reads training data whose classification is known from the training data storage device 224, calculates the plurality of separation surfaces which simultaneously optimize minimization of classification errors of the training data, minimization of complexity of the separation surface set and minimization of the size of each class region and stores them in the storage device 222. Next, the separation surface set output part 223 reads data defining the plurality of separation surfaces from the storage device 222 and stores in the separation surface set storage device 210 as the separation surface set 225.

Operations of the data classification device 200 in this exemplary embodiment are basically same as those of the data classification device 100 in the first exemplary embodiment shown in FIG. 1.

As described, in this exemplary embodiment, it is possible to achieve same effects as those obtained in the first exemplary embodiment, and simultaneously, the plurality of separation surfaces stored in the separation surface set storage device 210 can be replaced with a lastly updated plurality of separation surfaces calculated by the separation surface set calculation device 220. Thus, with the enhancement of the training data, the performance can be enhanced.

[Third Exemplary Embodiment]

Figure 9:
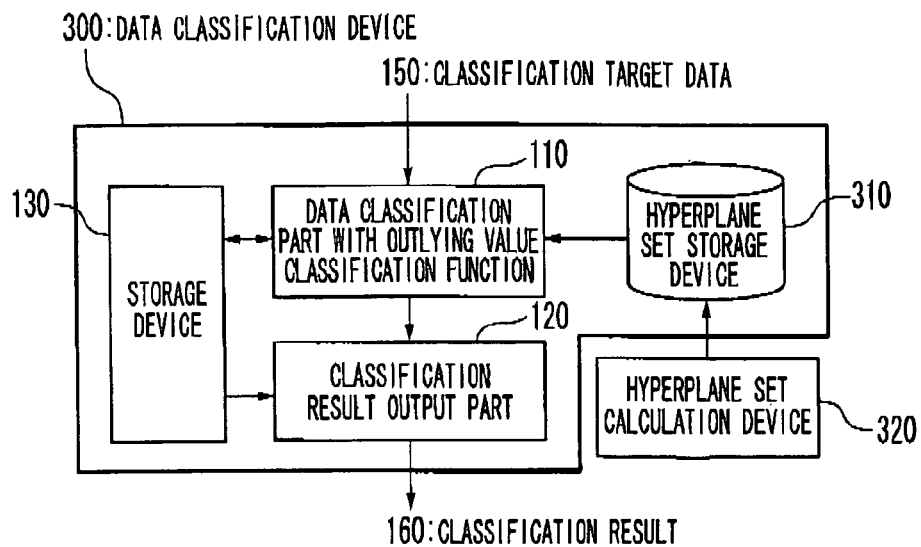
FIG. 9 is a block diagram showing a configuration of a data classification device according to a third exemplary embodiment of the present invention.

Referring to FIG. 9, a data classification device 300 according to a third exemplary embodiment of the present invention is different from the data classification device 200 according to the second exemplary embodiment shown in FIG. 7 in that a hyperplane set storage device 310 is provided in place of the separation surface set storage device 210 and a hyperplane set calculation device 320 is connected in place of the separation surface set calculation device 220.

Based on the plurality of training data classified into one or more known classes and the classification thereof, the hyperplane set calculation device 320 calculates a plurality of hyperplanes which separate the feature space into one or more class regions corresponding to one or more known classes and the other unknown class region. Each of one or more class regions is separated from the other region with two or more of the plurality of separation surfaces which do not intersect to each other. The hyperplane set storage device 310 is a device for storing information defining a plurality of hyperplanes calculated by the hyperplane set calculation device 320.

Figure 10:
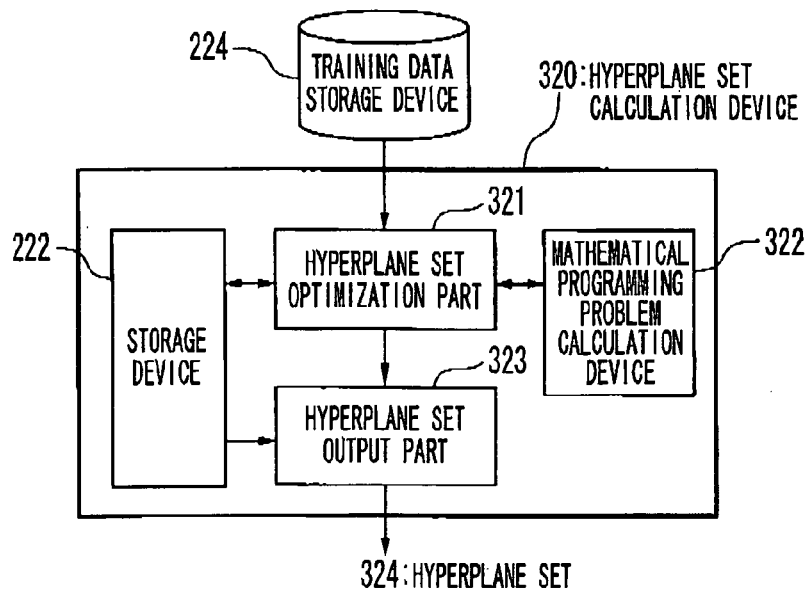
FIG. 10 is a block diagram showing a configuration of a hyperplane set calculation device according to a third exemplary embodiment of the present invention.

Referring to FIG. 10, the hyperplane set calculation device 320 has a hyperplane set optimization part 321, a storage device 222, a mathematical programming problem calculation device 322 and a hyperplane set output part 323. The hyperplane set optimization part 321 inputs training data from the training data storage device 224. The hyperplane set output part 323 outputs optimized hyperplane set 324. That is, the hyperplane set calculation device 320 calculates a plurality of hyperplanes which are parallel to each other for data classification. Namely, as shown in FIG. 2, the data classification device 300 in this exemplary embodiment achieves data classification by sectioning a region of each class by the parallel hyperplanes.

A specific calculation procedure of a hyperplane will be described below using some examples.

The index of the class of the data inputted from the training data storage device 224 is represented by $j=1, \ldots, C$ (C is an integer of 1 or more). Hereinafter, $X_i^j$ represents i-th data belonging to j-th class and $N_j$ represents the number of training data belonging to each class. With respect to the weight w and the intercept b, a hyperplane in the feature space is described as a set of points satisfying $w^T \phi(x)+b=0$. Here, providing $f(x)=w^T \phi(x)$. Since the hyperplanes are parallel to each other and the weight w is common, intercepts $b_j^+$ and $b_j^-$ with respect to w and j-th class of hyperplane are optimized by the hyperplane set optimization part 321.

When $\phi(x)$ is linear, the feature space becomes a vector space having the same number of dimensions as the dimension of training data (and classification target data). When $\phi(x)$ is nonlinear, the feature space becomes a vector space having the same number of dimensions as vector data obtained by nonlinearly converting training data (and classification target data).

By simultaneously optimizing following three conditions as standards for optimization:
(a) minimization of classification errors,
(b) minimization of complexity of f(x) and
(c) minimization of the size of each known class region,
bj+ and bj− with respect to w and each j are calculated.

In addition to the above-mentioned three conditions, by simultaneously optimizing one or both of following conditions;
(d) maximization of an unknown region surrounding the origin, and
(e) regions of classes do not overlap to each other (minimization of overlap of regions of classes),
$b_j^+$ and $b_j^-$ with respect to w and each j may be calculated.

As to the standard (c), the size of the region of each class with respect to the hyperplane is minimized. Thus, each class region needs to be tightly pressed from both sides.

As to the standard (d), a region in the vicinity of the origin needs to be an unknown class region for each hyperplane. The reason is that data in the space complementary to the space of the training data is considered to belong to the unknown class, and when the data is projected to the space of training data, the data is surely projected to the origin. Consider a three-dimensional case as an example. It is assumed that all of training data is distributed in the first and second dimensions so as to be represented as a $(1, 0, 0)+b (0, 1, 0)$. In this case, since elements in the first and second dimensions of data c $(0, 0, 1)$ of the unknown class distributed in the third dimension are 0, the data is surely projected to the origin in the space of the data.

Some specific examples of simultaneously optimizing a plurality of standards (a) to (e) will be described below.
[In a Case of C=1]

In a case where there is only single class in data inputted from the training data storage device 224, two hyperplanes which are parallel to each other are calculated. The two hyperplanes can be found by solving an optimization problem shown in formula (2), for example.

$$\min \frac{1}{2} w'w + \frac{1}{N_1} \sum_i (\xi_i^{1+} + \xi_i^{1-}) + v_1(b_1^+ - b_1^-) - v_0(b_1^+ + b_1^-) \quad (2)$$

subject to $$w'\phi(x_i^1) - b_1^+ \leq \xi_i^{1+}$$

-continued $$w'\phi(x_i^1) - b_1^- \geq \xi_i^{1-}$$

$$b_1^+ \geq b_1^-$$

$$b_1^- \geq 0$$

$$\xi_i^{1+} \geq 0$$

$$\xi_i^{1-} \geq 0$$

Figure 11:
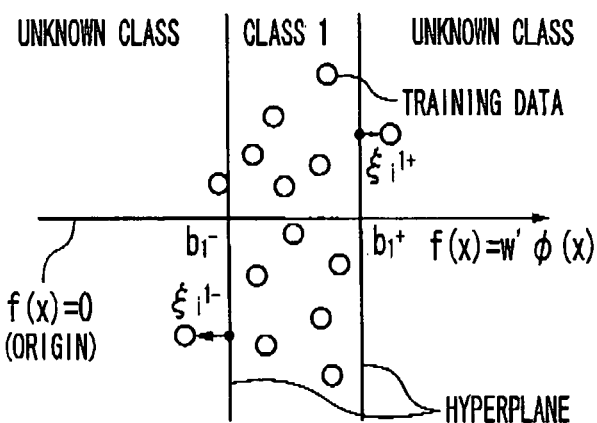
FIG. 11 is a conceptual view of data classification calculated by a data classification device according to a third exemplary embodiment of the present invention in a case where the number of classes is one.

In formula (2), the standards (a) to (d) are represented as (a) a second term, (b) a first term, (c) a third term and (d) a fourth term. The standard (e) need not be considered in the case of, one class. Each of $v_0$ and $v_1$ is a parameter for determining which of the standards is emphasized and a real value which is larger in a range from 0 to 1. The two hyperplanes according to formula (2) becomes hyperplanes as shown in FIG. 11. An objective function and a constraint condition in formula (2) will be described below.

The first term in the objective function of formula (2) is a term required for the optimization standard (b), and when the L2 complexity is adopted as complexity, the L2 complexity of f(x) is calculated in this manner. The second term is a term required for the optimization standard (a) and $\xi_i^{1+}$ and $\xi_i^{1-}$ are slack variables for representing an error. The third term is required for the optimization standard (c) and due to the relation $b_1^- \leq w'\phi(x_i^1) \leq b_1^+$, by making $b_1^- - b_1^+$ small, a region enclosing the known class is minimized. The fourth term is required for the optimization standard (d). Maximization of size of the unknown region around the origin means keeping the known class away from the origin. For this reason, by keeping the center of the known class $(b_1^- + b_1^+)/2$ away from the origin, the standard (d) is achieved.

$w'\phi(x_i^1) - b_1^+ \leq \xi_i^{1+}$, $w'\phi(x_i^1) - b_1^- \geq -\xi_i^{1-}$, $\xi_i^{1+} \geq 0$, $\xi_i^{1-} \geq 0$ in a constraint condition of formula (2) has following meaning. That is, as shown in FIG. 11, data belonging to the class 1 is required to be arranged between $b_1^+$ and $b_1^-$ (that is, $b_1^- \leq w'\phi(x_i^1) \leq b_1^+$) and data which is positioned outside the range is counted as an error. The relation $b_1^+ \geq b_1^-$ is a constraint condition necessary for $b_1^- \leq w'\phi(x_i^1) \leq b_1^+$. The relation $b_1^- \geq 0$ is a constraint condition necessary to make the origin region the unknown region. In other words, without a constraint condition $b_1^- \geq 0$, the relationship $b_1^- \leq 0 \leq b_1^+$ may hold. The relation $b_1^+ \leq 0$ may be replaced with $b_1^- \geq 0$.

Formula (2) is a standard convex quadratic programming problem and an optimum solution is calculated by the hyperplane set optimization part 321 and the mathematical programming problem calculation device 322.

When the feature space is nonlinear and the map $\phi$ to the feature space is not explicitly given, generally, formula (2) cannot be directly solved. However, in the case that the inner product in the feature space is defined as the kernel function, the hyperplane can be calculated by solving a dual problem of formula (2).

By introducing Lagrange's undetermined multipliers as in formula (3), a dual problem of formula (2) becomes formula (4).

$$L_P = \frac{1}{2} w'w + \frac{1}{N_1} \sum_i (\xi_i^{1+} + \xi_i^{1-}) + v_1(b_1^+ - b_1^-) - v_0(b_1^+ + b_1^-) - \quad (3)$$

$$\sum_i \alpha_i^{1+}(\xi_i^{1+} - w'\phi(x_i^1) + b_1^+) - \sum_i \alpha_i^{1-}(\xi_i^{1-} + w'\phi(x_i^1) - b_1^-) -$$

$$\mu_1(b_1^- - b_1^-) - \mu_0 b_1^- - \sum_i (\gamma_i^{1+} \xi_i^{1+} - \gamma_i^{1-} \xi_i^{1-})$$

-continued $$\max -\frac{1}{2}\sum_{i,i'}(\alpha_i^{1-}-\alpha_i^{1+})(\alpha_{i'}^{1-}-\alpha_{i'}^{1+})k(x_i^1, x_{i'}^1) \quad (4)$$

subject to $$\sum_i \alpha_i^{1+} + \mu_1 = v_1$$

$$\sum_i \alpha_i^{1-} + \mu_1 - \mu_0 = v_1$$

$$0 \le \alpha_i^{1+} \le \frac{1}{N_1}$$

$$0 \le \alpha_i^{1-} \le \frac{1}{N_l}$$

$$\mu_1, \mu_0 \ge 0$$

Lagrange's undetermined multipliers are $\alpha_i^{1+}, \alpha_i^{1-}, \mu_0, \mu_1, \gamma_i^{1+}, \gamma_i^{1-}$, and $\delta$. However, $k(x_1^1, x_i^{i1}) = \phi(x_i^1)^T \phi(x_i^{i1})$ is the inner product in the feature space and even when $\phi(x)$ is any function in the dual problem, if only the inner product $\phi(x_i^1)^T \phi(x_i^{i1})$ can be calculated, the problem can be solved. The dual problem represented as formula (4) is also a convex quadratic programming problem.

For the dual problem, the weight w is represented as formula (5) and $f(x) = w^T \phi(x)$ is represented as formula (6). When the dual problem is solved, stored content is a set of $\alpha_i$ and b, not $w_i$ and b in FIG. 4.

$$w = \sum_i (\alpha_i^{1-} - \alpha_i^{1+}) \phi(x_i^1) \quad (5)$$

$$f(x) = \sum_i (\alpha_i^{1-} - \alpha_i^{1+}) \phi(x_i^1) \phi(x) = \sum_i (\alpha_i^{1-} - \alpha_i^{1+}) k(k_i^1, x) \quad (6)$$

[In a Case of C=2]

In a case where there are two classes of data inputted from the training data storage device 224, two hyperplanes which are parallel to each other are calculated. The plurality of hyperplanes can be found by solving an optimization problem shown in formula (7), for example.

$$\min \frac{1}{2} w'w + \frac{1}{N}\sum_{i,j}(\xi_i^{j+} + \xi_i^{j-}) + v_1 \sum_j (b_j^+ - b_j^-) - v_0 \sum_j |b_j^+ + b_j^-| \quad (7)$$

subject to $$w'\phi(x_i^j) - b_j^+ \le \xi_i^{j+}$$

$$w'\phi(x_i^j) - b_j^- \ge \xi_i^{j-}$$

$$b_j^+ \ge b_j^-$$

$$b_1^- \ge 0$$

$$0 \ge b_2^+$$

$$\xi_i^{j+} \ge 0$$

$$\xi_i^{j-} \ge 0$$

Figure 12:
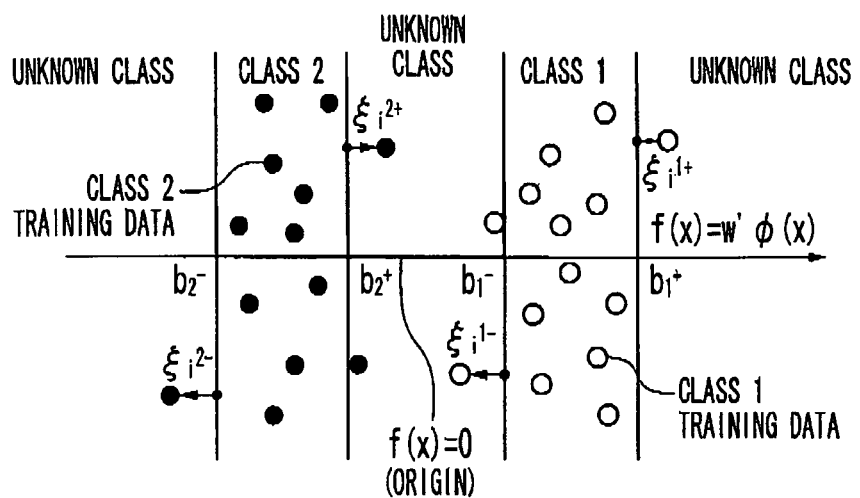
FIG. 12 is a conceptual view of data classification calculated by a data classification device in accordance with a third exemplary embodiment of the present invention in a case where the number of classes is two.

In formula (7), the standards (a) to (e) are represented as (a) the second term, (b) the first term; (c) the third term and (d) the fourth term. The standard (e) need not be explicitly considered since $b_1^- \ge b_2^+$ is automatically satisfied. Each of $v_0$, $v_1$ and $v_2$ is a parameter for determining which of the standards is emphasized and a real value in a range from 0 to 1. The plurality of hyperplanes calculated according to formula (7) becomes hyperplanes as shown in FIG. 12. An objective function and a constraint condition in formula (7) will be described below.

The fourth term in the objective function of formula (7) is a term necessary for the optimization standard (e). The absolute value sign is added since both $b_2^-$ and $b_2^+$ become negative in the case of j=2. The constraint condition $0 \ge b_2^+$ in the formula (7) is a condition so that both of two classes do not intersect the origin O. That is, to avoid such situations as $b_1^- \le 0 \le b_1^+$ and $b_2^- \le 0 \le b_2^+$, following three cases are considered. Both classes are on a positive side (that is, $0 \le b_1^-$ and $0 \le b_2^-$), both classes are on a negative side (that is, $b_1^+ \le 0$ and $b_2^+ \le 0$), and each class is on an opposite side to the other class across the origin O. In formula (7), the last case is adopted.

As in the case of C=1, formula (7) is a convex quadratic programming problem. It is possible to derive a dual problem in a same procedure as in obtaining formula (4) from formula (2) and solve the dual problem, thereby achieving optimization. The dual problem of formula (7) also becomes a convex quadratic programming problem.

[In a Case of C≥3]

In the case where there are three or more classes in the data inputted from the training data storage device 224, to calculate a set of a plurality of hyperplanes which are parallel to one another, optimization in the case of C=2 is performed for a combination of any two of inputted classes and a majority vote is taken by using thus obtained set of the plurality of hyperplanes.

Alternatively, for example, by solving the optimization problem shown as formula (8), a set of the plurality of hyperplanes which are parallel to one another can be calculated.

$$\min \frac{1}{2} w'w + \frac{1}{N}\sum_{i,j}(\xi_i^{j+} + \xi_i^{j-}) + \sum_j v_j(b_j^+ - b_j^-) - v_0(b_0^+ - b_0^-) \quad (8)$$

subject to $$w'\phi(x_i^j) - b_j^+ \le \xi_i^{j+}$$

$$w'\phi(x_i^j) - b_j^- \ge -\xi_i^{j-}$$

$$b_j^+ \ge b_j^-$$

$$b_0^+ \ge 0$$

$$0 \ge b_0^-$$

$$\xi_i^{j+} \ge 0$$

$$\xi_i^{j-} \ge 0$$

$$b_j^- \ge b_k^+ - \psi_{jk}^-$$

$$b_j^+ \le b_k^- + \psi_{jk}^+$$

$$\psi_{jk}^- \psi_{jk}^+ = 0$$

$$b_j^- \ge b_0^+ - \psi_{j0}^-$$

$$b_0^- \le b_j^+ + \psi_{j0}^+$$

$$\psi_{j0}^- \psi_{j0}^+ = 0$$

In formula (8), the standards (a) to (e) are represented as (a) the second term, (b) the first term, (c) the third term, (d) the fourth term. The standard (e) is expressed by a constraint condition on $\phi$. An objective function and a constraint condition in formula (8) will be described below.

In the cases of one class and two classes in formula (2) and formula (7), since the order of the regions of the classes in the feature space is predetermined, the standard (e) can be achieved by keeping the region of each class away from the origin. However, generally, in a case of multi-classes, the order of regions of the classes is unobvious. As an example of the procedure, to solve the problem by considering all combinations thereof can be proposed, but it disadvantageously leads to a large amount of calculation. In the case of the optimization using the formula (8), a most suitable order is automatically determined without considering such combinations.

Figure 13:
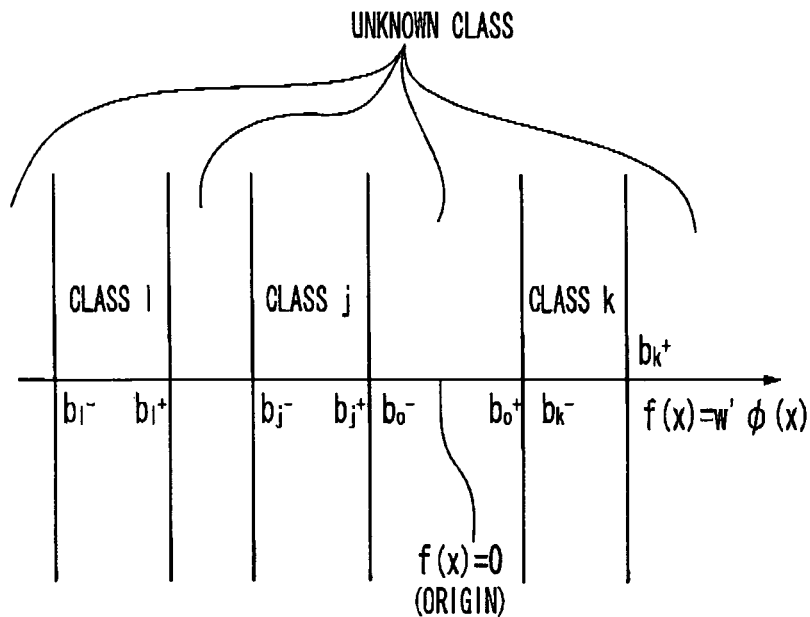
FIG. 13 is a conceptual view of data classification calculated by a data classification device according to a third exemplary embodiment of the present invention in a case where the number of classes is three or more.

For this reason, first, as shown in FIG. 13, the region of the unknown class around the origin is defined as a region sandwiched between $b_0^-$ and $b_0^+$, a constraint condition represented by $b_0^+ \geq 0$, $0 \geq b_0^-$ is set condition and the fourth term of the objective function is provided for maximizing the region (since the sign of the fourth term is negative and the objective function is minimized, the region is maximized).

Figure 14:
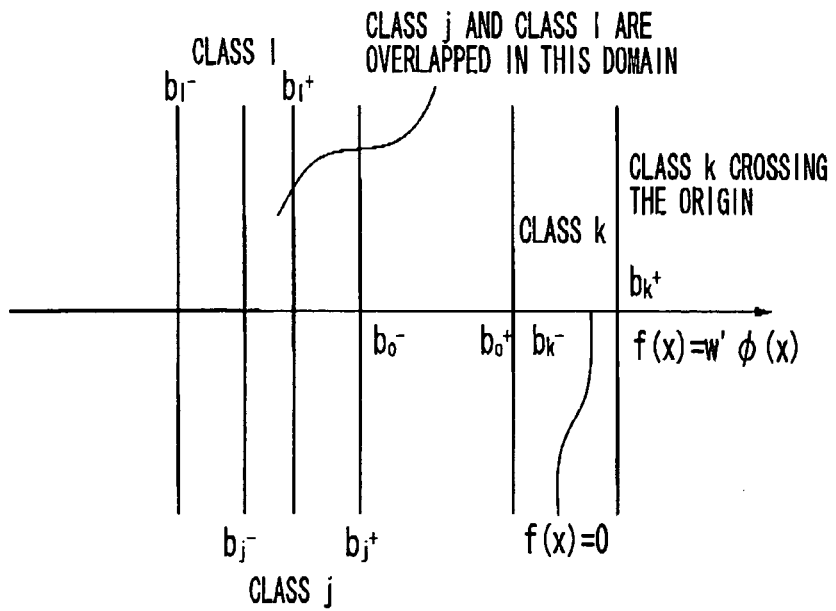
FIG. 14 is an explanation view of a hyperplane which is unfavorable to be used in a data classification device according to a third exemplary embodiment of the present invention.

Next, a constraint is required for preventing the regions of the known classes (and the unknown class region around the origin) from overlapping each other as shown in FIG. 14. In the case where the order of the regions of classes and the positional relation of the regions to the origin are explicitly predetermined, it is possible to explicitly set such constraint in the order as $b_1^- \leq 0$, $b_2^- \geq 0$, $b_2^+ \leq b_3^-$ in which the regions do not overlap each other. When all combinations are considered, such constraint condition is set. However, since formula (8) assumes that the order is unknown in advance, such constraint cannot be set. Then, a constraint for preventing the regions of known classes (and the unknown class region around the origin) from overlapping each other is set as follows: $b_j^- \geq b_k^+ - \Psi_{jk}^-$, $b_j^+ \leq b_k^- + \Psi_{jk}^+$, $\Psi_{jk}^- \Psi_{jk}^+ = 0$ and $b_j^- \geq b_0^+ - \Psi_{j0}^-$, $b_0^- \leq b_j^+ + \Psi_{j0}^+$, $\Psi_{j0}^- \Psi_{j0}^+ = 0$.

When $b_j^- \geq b_k^+$ holds with respect to $b_j^- \geq b_k^+ - \Psi_{jk}^-$ (that is, a class j is on a positive side from a class k), $\Psi_{jk}^- = 0$ holds. Conversely, when $b_j^+ \leq b_k^-$ holds with respect to $b_j^+ \leq b_k^- + \Psi_{jk}^+$ (that is, the class j is on a negative side from the class k), $\Psi_{jk}^+ = 0$ holds. Since for avoiding overlapping between the classes it is required to satisfy $b_j^- \geq b_k^+$ or $b_j^+ \leq b_k^-$, it is required to satisfy $\Psi_{jk}^- = 0$ or $\Psi_{jk}^+ = 0$. Therefore, it is possible to set a condition that classes do not overlap each other by a constraint of $\Psi_{jk}^- \Psi_{jk}^+ = 0$.

The constraint condition on $\Psi_{j0}^+$, $\Psi_{j0}^-$ represents a similar constraint on the region around the origin and the region of the known classes.

Next, operations of this exemplary embodiment will be described.

The operations in this exemplary embodiment are broadly divided into a calculation process of hyperplanes performed by the hyperplane set calculation device 320 and a classification process of the classification target data 150 using the calculated hyperplanes.

In the calculation process of the hyperplanes performed by the hyperplane set calculation device 320, the hyperplane set optimization part 321 reads training data whose classification is known from the training data storage device 224, calculates a plurality of hyperplanes which simultaneously optimize minimization of classification errors regarding to the training data, minimization of complexity of the hyperplane set and minimization of the size of each class region and stores the calculated hyperplanes in the storage device 222. Next, the hyperplane set output part 323 reads data defining the plurality of hyperplanes from the storage device 222 and stores the data in the hyperplane set storage device 310 as the hyperplane set 324.

Operations of the data classification device 300 in this exemplary embodiment are basically same as those of a data classification device 100 in a first exemplary embodiment shown in FIG. 1.

As described above, since this exemplary embodiment can achieve same effects as those obtained in a first exemplary embodiment, and simultaneously, the plurality of hyperplanes stored in the hyperplane set storage device 310 can be replaced with the lastly updated plurality of hyperplanes calculated by the hyperplane set calculation device 320. Thus, with an enhancement of the training data, the performance can be enhanced.

[Fourth Exemplary Embodiment]

Figure 15:
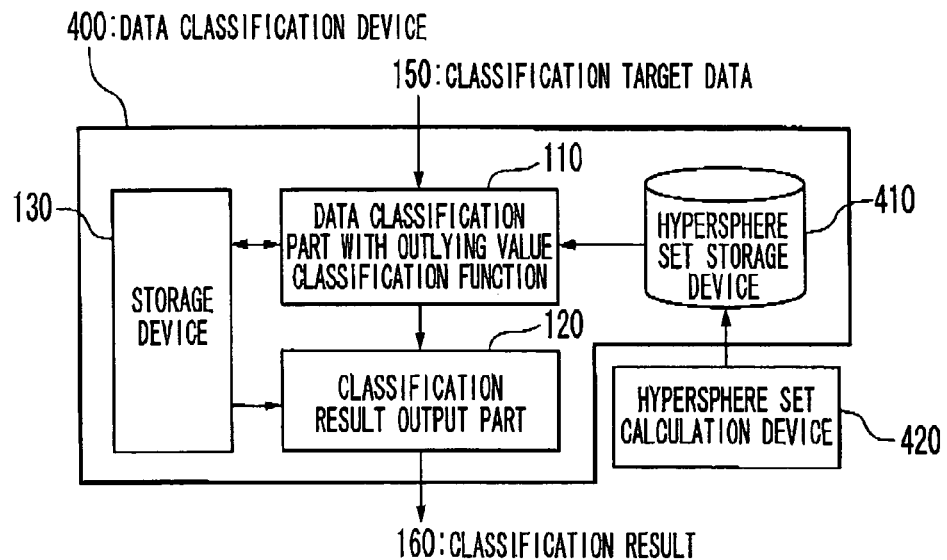
FIG. 15 is a block diagram showing a configuration of a data classification device according to a fourth exemplary embodiment of the present invention.

Referring to FIG. 15, a data classification device 400 in accordance with a fourth exemplary embodiment of a present invention is different from a data classification device 200 in accordance with a second exemplary embodiment shown in FIG. 7 in that a hypersphere set storage device 410 is provided in place of the separation surface set storage device 210 and a hypersphere set calculation device 420 is connected to in place of the separation surface set calculation device 220.

Based on the plurality of training data classified into one or more known classes and the classification thereof, the hypersphere set calculation device 420 calculates a plurality of hyperspheres which separate a feature space into one or more class regions corresponding to one or more known classes and the other unknown class region, wherein two or more of the plurality of hyperspheres exist for each class and are concentric to each other. The hypersphere set storage device 410 stores information defining the plurality of hyperspheres calculated by the hypersphere set calculation device 420.

Figure 16:
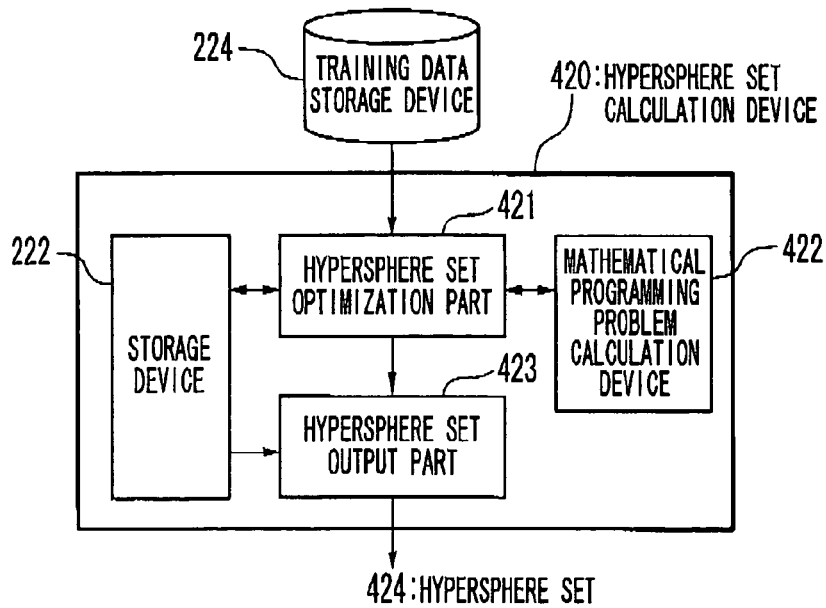
FIG. 16 is a block diagram showing a configuration of a hypersphere set calculation device according to a fourth exemplary embodiment of the present invention.

Referring to FIG. 16, the hypersphere set calculation device 420 includes a hypersphere set optimization part 421, a storage device 222, a mathematical programming problem calculation device 422 and a hypersphere set output part 423, inputs training data from the training data storage device 224 and outputs optimized hypersphere set 424. In other words, the hypersphere set calculation device 420 calculates a plurality of concentric hyperspheres for data classification. Therefore, the data classification device 400 in this exemplary embodiment, as shown in FIG. 3, achieves data classification by separating each class region with the concentric hyperspheres.

Hereinafter, a specific calculation procedure will be described using some examples.

The index of the class on the data inputted from the training data storage device 224 is represented by j=1, . . . , C. Also, the i-th data belonging to j-th class is represented by $x_i^j$ and the number of training data belonging to each class is represented by $N_j$ in the following explanation. Given that the center of the hypersphere is c and its radius is r, the hypersphere can be expressed as $|\phi(x)-c|^2 = r$. Since the hyperspheres are concentric and the center c is common for each class, c and the outer radius $r_j^+$ and the inner radius $r_j^-$ with respect to j-th class are optimized by the hypersphere set optimization part 421.

As optimization standards, c and $r_j^+$ and $r_j^-$ for each j are calculated by simultaneously optimizing following three conditions.

(a') minimization of classification errors (b') minimization of complexity of c (c') minimization of size of each known class region In addition to the above-mentioned conditions, c and $r_j^+$ and $r_j^-$ for each j may be calculated by simultaneously optimizing one or both of (d') maximization of the unknown region around the origin; and (e') regions of the classes do not overlap.

The formula (9) shows a specific example for simultaneously optimizing the plurality of standards (a') to (e').

Although formula (9) can apply to any number of classes, the order of classes is required to be known.

$$\min \sum_j (r_j^{+2} - r_j^{-2}) + \frac{1}{N} \sum_{i,j} (\xi_i^{j+} + \xi_i^{j-}) - v_0 \min\{r_j^-\} \quad (9)$$

subject to $$|\phi(x_i^j) - c|^2 \le r_j^{+2} + \xi_i^{j+}$$

$$|\phi(x_i^j) - c|^2 \ge r_j^{-2} - \xi_i^{j-}$$

$$r_j^+ \ge r_j^-$$

$$r_{j+1}^- \ge r_j^+$$

$$\min\{r_j^-\} \ge 0$$

$$c^2 \le \min\{r_j^-\}^2$$

$$\xi_i^{j+} \ge 0$$

$$\xi_i^{j-} \ge 0$$

Figure 17:
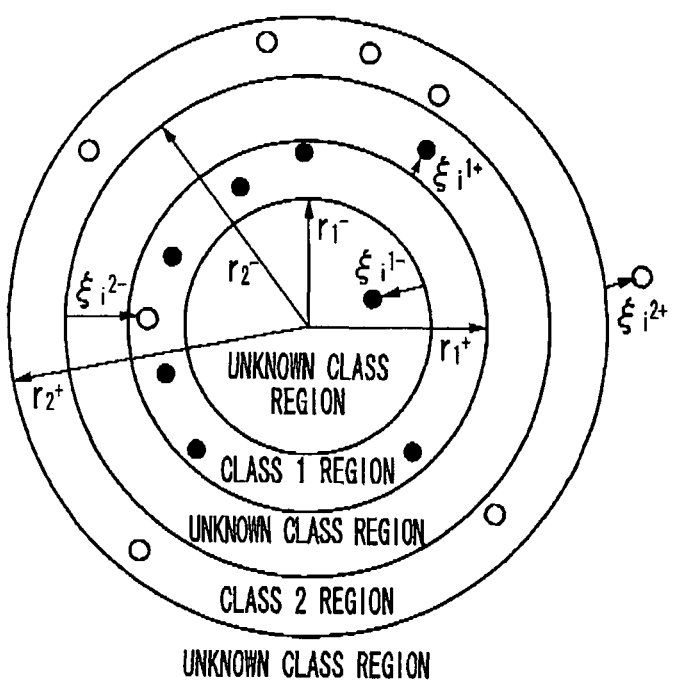
FIG. 17 is a conceptual view of data classification calculated by a data classification device according to a fourth exemplary embodiment.
Figure 18:
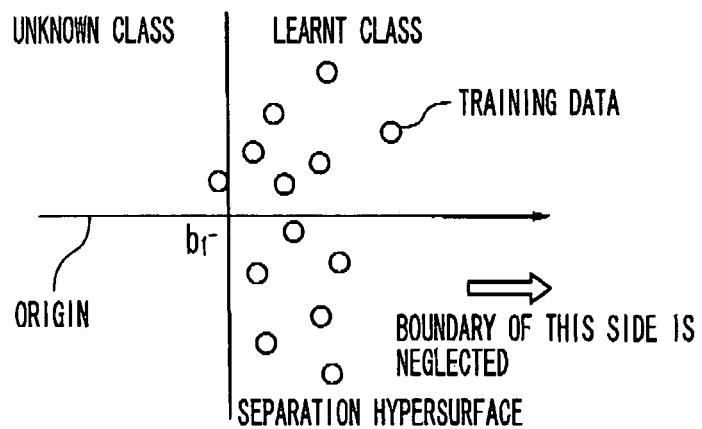
FIG. 18 is an example of a data classification technique using a hyperplane related to the present invention.
Figure 19:
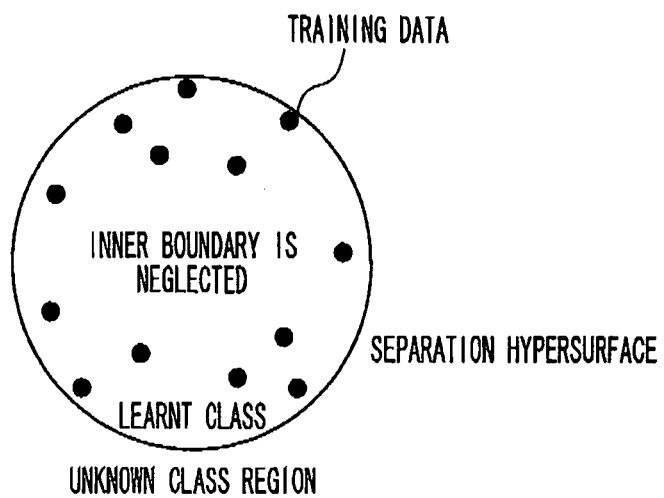
FIG. 19 is an example of a data classification technique using a hypersphere related to the present invention.

An example of a hypersphere set calculated according to formula (9) is shown in FIG. 17. Since a concave portion and a convex portion of an objective function and a constraint condition are added in formula (9); it is possible to efficiently calculate an optimum solution by using Concave-Convex Procedure (refer to Document 8). In the following, an explanation of the objective function and the constraint condition in formula (9) will be given.

The first term in the objective function of the formula (9) whose form is an outer radius–inner radius of the region of a class j is a term required for the optimization standard (c'). The second term corresponds to the second term of formula (7) and is a term required for the optimization standard (a'). The third term is a term required for an optimization standard (d'). The reason is as follows.

First, by the constraint condition $c^2 \le \{\min\{r_j^-\}\}^2$, a constraint that the origin is located inner from the smallest hypersphere is set. Because $c^2$ is a distance between the origin and the center of the hypersphere and $\min\{r_j^-\}^2$ is a distance between the center of the hypersphere and the innermost hypersphere (that is, its radius). In other words, the inside of the innermost sphere is the unknown class around the origin. Therefore, by increasing $\min\{r_j^-\}^2$, the standard (d') is satisfied.

The standard (b') is not explicitly included in the objective function of formula (9), but implicitly included in the constraint condition. The standard (e') is constraint by $r_j^+ \ge r_j^+$, $r_{j+1}^- \ge r_j^+$.

Next, operations in this exemplary embodiment will be described.

Operations in this exemplary embodiment are broadly divided into a calculation process of hyperspheres performed by the hypersphere set calculation device 420 and a classification process of the classification target data 150 performed by using the calculated hyperspheres.

In the calculation process of the hyperspheres by the hypersphere set calculation device 420, the hypersphere set optimization part 421 reads training data whose classification is known from the training data storage device 224, calculates the plurality of hyperspheres which simultaneously optimize minimization of classification errors with respect to the training data, minimization of complexity of the hypersphere set and minimization of size of each class region and stores them in the storage device 222. Next, the hypersphere set output part 323 reads data defining the plurality of hyperspheres from the storage device 222 and stores the data in the hypersphere set storage device 410 as the hypersphere set 424.

Operations of the data classification device 400 in this exemplary embodiment are basically same as those of the data classification device 100 in the first exemplary embodiment shown in FIG. 1.

As described above, since this exemplary embodiment can achieve same effects as those obtained in a first exemplary embodiment, and simultaneously, the plurality of hyperspheres stored in the hypersphere set storage device 410 can be replaced with the lastly updated plurality of separation surfaces calculated by the hypersphere set calculation device 420. Thus, with an enhancement of the training data, performance can be enhanced.

In the above explanation, exemplary embodiments of a present invention have been described. However, the present invention is not limited to the above-mentioned exemplary embodiments and various types of additions and modifications can be made. And also, functions of the data classification device of the present invention can be implemented by hardware means as well as implemented by a computer and a program. The program is recorded and provided in a computer readable-recording medium such as a magnetic disc and a semiconductor memory is read by the computer at start-up of the computer or the like and controls operations of the computer, thereby allowing the computer to function as the data classification device, the separation surface, set calculation device, the hyperplane set calculation device and the hypersphere set calculation device in each of the above-mentioned exemplary embodiments and to perform the above-mentioned processes.

The invention claimed is:

1. A data classification apparatus including a computer, the data classification apparatus comprising:
   a separation surfaces set storage unit configured to store information defining a plurality of separation surfaces which separate a feature space into at least one known class region respectively corresponding to at least one known class and an unknown class region, wherein each of the at least one known class region is separated from outside region by more than one of the plurality of separation surfaces which do not intersect to each other;
   a classification unit configured to determine a classification of a classification target data whose inner product in the feature space is calculable by calculating to which region of the at least one known class region and the unknown class region determined by the information stored in the separation surface set storage unit the classification target data belongs; and
   a separation surface set calculation unit configured to calculate the plurality of separation surfaces based on: a plurality of training data respectively classified into any of the at least one known class and whose inner product in the feature space is calculable; and a classification of each of the plurality of training data, to store the information which defines the plurality of separation surfaces in the separation surface set storage unit,
   wherein the separation surface set calculation unit is configured to calculate the plurality of separation surfaces by setting minimization of a classification error of the plurality of training data, minimization of a complexity of the plurality of separation surfaces, and minimization of an area of each of the at least one known class region as optimization target, and wherein the optimization target is targeted to solve either one of the following optimization problems:

$$\min \frac{1}{2} w'w + \frac{1}{N}\sum_{i,j}(\xi_i^{j+} + \xi_i^{j-}) + v_1\sum_{j}(b_j^+ - b_j^-) - v_0\sum_{j}|b_j^+ + b_j^-|$$

subject to $$w'\phi(x_i^j) - b_j^+ \leq \xi_i^{j+} \quad w'\phi(x_i^j) - b_j^- \geq -\xi_i^{j-} \quad b_j^+ \geq b_j^-$$

$$b_1^- \geq 0 \quad 0 \geq b_2^+ \quad \xi_i^{j+} \geq 0 \quad \xi_i^{j-} \geq 0$$

and $$\min \frac{1}{2} w'w + \frac{1}{N}\sum_{i,j}(\xi_i^{j+} + \xi_i^{j-}) + \sum_{j} v_j(b_j^+ - b_j^-) - v_0(b_0^+ - b_0^-)$$

subject to $$w'\phi(x_i^j) - b_j^+ \leq \xi_i^{j+} \quad w'\phi(x_i^j) - b_j^- \geq -\xi_i^{j-} \quad b_j^+ \geq b_j^-$$

$$b_0^+ \geq 0 \quad 0 \geq b_0^- \quad \xi_i^{j+} \geq 0 \quad \xi_i^{j-} \geq 0$$

$$b_j^- \geq b_k^- - \psi_{jk}^- \quad b_j^+ \leq b_k^- + \psi_{jk}^+ \quad \psi_{jk}^- \psi_{jk}^+ = 0$$

$$b_j^- \geq b_0^+ - \psi_{j0}^- \quad b_0^- \leq b_j^+ + \psi_{j0}^+ \quad \psi_{j0}^- \psi_{j0}^+ = 0$$

where i, j are an index of a training data,
w is a weight,
$b_j^+$, $b_j^-$ is an intercept,
each of $v_0$ and $v_1$ is a parameter for determining which of the standards is emphasized and a real value which is greater than 0,
N is a predetermined integer,
$\phi(x_i^j)$ is an image of the data $x_i^j$ which is i-th data belonging to j-th class in a feature space,
$\xi_i^{j+}$, $\xi_i^{j-}$ are slack variables for representing an error, and
$\psi$ is a basis function of the feature space.

2. The data classification apparatus according to claim 1, wherein the separation surface set calculation unit further sets maximization of a size of the unknown class region around an origin as the optimization target.

3. The data classification apparatus according to claim 1, wherein the separation surface set calculation unit further sets minimization of overlapping area where the at least one known class are overlapped to each other as the optimization target.

4. The data classification apparatus according to claim 1, wherein each of the plurality of separation surface comprises an open hyperplane in the feature space.

5. The data classification apparatus according to claim 1, wherein the known classification is centered around the centerpoint of a bounding hypersphere.

6. The data classification apparatus according to claim 1, wherein the
feature space comprises a vector space of a dimension same to the training data and the classification target data.

7. The data classification apparatus according to claim 1, wherein the feature space comprises a space characterized by a non-linear conversion to the training data and the classification target data.

8. The data classification apparatus according to claim 1, wherein the separation surfaces set storage unit, the classification unit, and the data classification part with an outlying value classification function are hardware units.

9. The data classification apparatus according to claim 1, wherein the data classification part with an outlying value classification function calculates a positional relationship between the classification target data and the plurality of separation surfaces by using input classification target data and information of the plurality of separation surfaces by determining a positional relationship with respect to an outer side and inner side from hyperspheres of the plurality of separation surfaces, and
wherein the data classification part with an outlying value classification function reads classification rules stored in the separation surfaces set storage unit and determines which class the classification target data belongs to for output.

10. The data classification apparatus according to claim 1, wherein identification and outlying value classification is performed simultaneously by the data classification part with the outlying value classification function of the classification unit.

11. A data classification method comprising:
inputting classification target data whose inner product in a feature space is calculable;
inputting a plurality of separation surfaces which separate the feature space into at least one known class region respectively corresponding to at least one known class and an unknown class region from a separation surface set storage part, wherein each of the at least one known class region is separated from outside region by more than one of the plurality of separation surfaces which do not intersect to each other;
classifying the classification target data by calculating to which region of the at least one known class region and the unknown class region the classification target data belongs;
calculating the plurality of separation surfaces based on:
a plurality of training data respectively classified into any of the at least one known class and whose inner product in the feature space is calculable; and
a classification of each of the plurality of training data, to store the information which defines the plurality of separation surfaces in the separation surface set storage part,
wherein in the calculating, the plurality of separation surfaces are calculated by setting minimization of a classification error of the plurality of training data, minimization of a complexity of the plurality of separation surfaces, and minimization of an area of each of the at least one known class region as optimization target, and
wherein the optimization target is targeted to solve either one of the following optimization problems:

$$\min \frac{1}{2} w'w + \frac{1}{N}\sum_{i,j}(\xi_i^{j+} + \xi_i^{j-}) + v_1\sum_{j}(b_j^+ - b_j^-) - v_0\sum_{j}|b_j^+ + b_j^-|$$

subject to $$w'\phi(x_i^j) - b_j^+ \leq \xi_i^{j+} \quad w'\phi(x_i^j) - b_j^- \geq -\xi_i^{j-} \quad b_j^+ \geq b_j^-$$

$$b_1^- \geq 0 \quad 0 \geq b_2^+ \quad \xi_i^{j+} \geq 0 \quad \xi_i^{j-} \geq 0$$

and $$\min \frac{1}{2} w'w + \frac{1}{N}\sum_{i,j}(\xi_i^{j+} + \xi_i^{j-}) + \sum_{j} v_j(b_j^+ - b_j^-) - v_0(b_0^+ - b_0^-)$$

subject to $$w'\phi(x_i^j) - b_j^+ \leq \xi_i^{j+} \quad w'\phi(x_i^j) - b_j^- \geq -\xi_i^{j-} \quad b_j^+ \geq b_j^-$$

$$b_0^+ \geq 0 \quad 0 \geq b_0^- \quad \xi_i^{j+} \geq 0 \quad \xi_i^{j-} \geq 0$$

-continued $$b_j^- \geq b_k^+ - \psi_{jk}^- \quad b_j^+ \leq b_k^- + \psi_{jk}^+ \quad \psi_{jk}^- \psi_{jk}^+ = 0$$

$$b_j^- \geq b_0^+ - \psi_{j0}^- \quad b_0^- \leq b_j^+ + \psi_{j0}^+ \quad \psi_{j0}^- \psi_{j0}^+ = 0$$

where i, j are an index of a training data,
w is a weight,
$b_j^+$, $b_j^-$ is an intercept,
each of $v_0$ and $v_1$ is a parameter for determining which of the standards is emphasized and a real value which is greater than 0,
N is a predetermined integer,
$\phi(x_i^j)$ is an image of the data $x_i^j$ which is i-th data belonging to j-th class in a feature space,
$\xi_i^{j+}$, $\xi_i^{j-}$ are slack variables for representing an error, and
$\psi$ is a basis function of the feature space.

12. The data classification method according to claim 11, wherein in the calculating the plurality of separation surfaces, maximization of a size of the unknown class region around an origin is further set as the optimization target.

13. The data classification method according to claim 11, wherein in the calculating the plurality of separation surfaces, minimization of overlapping area where the at least one known class are overlapped to each other is further set as the optimization target.

14. The data classification method according to claim 11, wherein identification and outlying value classification is performed simultaneously,
wherein the positional relationship between the plurality of separation surfaces and the classification target data is calculated, then the separation surfaces separate the feature space into one or more class regions corresponding to one or more known classes and the other unknown class region, and then, by calculating which region of one or more class regions and the other unknown class region the classification target data belongs to, the classification target data is classified for output.

15. A separation surface set calculation apparatus including a computer, the separation surface set calculation apparatus comprising:
a training data storage device configured to store a plurality of training data whose inner product in a feature space is calculable and respectively classified into any of at least one known class;
a separation surface set calculation device configured to calculate a plurality of separation surfaces which separate the feature space into at least one known class region respectively corresponding to the at least one known class and an unknown class region, based on: the plurality of training data stored in the training data storage device, and a classification of each of the plurality of training data,
wherein each of the at least one known class region is separated from outside region by more than one of the plurality of separation surfaces which do not intersect to each other; and
a separation surface set storage device configured to store information defining the plurality of separation surfaces,
wherein the separation surface set calculation device is configured to calculate the plurality of separation surfaces by setting minimization of a classification error of the plurality of training data, minimization of a complexity of the plurality of separation surfaces, and minimization of an area of each of the at least one known class region as optimization target, and
wherein the optimization target is targeted to solve either one of the following optimization problems:

$$\min \frac{1}{2} w'w + \frac{1}{N} \sum_{i,j} (\xi_i^{j+} + \xi_i^{j-}) + v_1 \sum_j (b_j^+ - b_j^-) - v_0 \sum_j |b_j^+ + b_j^-|$$

subject to $$w'\phi(x_i^j) - b_j^+ \leq \xi_i^{j+} \quad w'\phi(x_i^j) - b_j^- \geq -\xi_i^{j-} \quad b_j^+ \geq b_j^-$$

$$b_1^- \geq 0 \quad 0 \geq b_2^+ \quad \xi_i^{j+} \geq 0 \quad \xi_i^{j-} \geq 0$$

and $$\min \frac{1}{2} w'w + \frac{1}{N} \sum_{i,j} (\xi_i^{j+} + \xi_i^{j-}) + \sum_j v_j(b_j^+ - b_j^-) - v_0(b_0^+ - b_0^-)$$

subject to $$w'\phi(x_i^j) - b_j^+ \leq \xi_i^{j+} \quad w'\phi(x_i^j) - b_j^- \geq -\xi_i^{j-} \quad b_j^+ \geq b_j^-$$

$$b_0^+ \geq 0 \quad 0 \geq b_0^- \quad \xi_i^{j+} \geq 0 \quad \xi_i^{j-} \geq 0$$

$$b_j^- \geq b_k^+ - \psi_{jk}^- \quad b_j^+ \leq b_k^- + \psi_{jk}^+ \quad \psi_{jk}^- \psi_{jk}^+ = 0$$

$$b_j^- \geq b_0^+ - \psi_{j0}^- \quad b_0^- \leq b_j^+ + \psi_{j0}^+ \quad \psi_{j0}^- \psi_{j0}^+ = 0$$

where i, j are an index of a training data,
w is a weight,
$b_j^+$, $b_j^-$ is an intercept,
each of $v_0$ and $v_1$ is a parameter for determining which of the standards is emphasized and a real value which is greater than 0,
N is a predetermined integer,
$\phi(x_i^j)$ is an image of the data $x_i^j$ which is i-th data belonging to j-th class in a feature space,
$\xi_i^{j+}$, $\xi_i^{j-}$ are slack variables for representing an error, and
$\psi$ is a basis function of the feature space.

16. The separation surface set calculation apparatus according to claim 15, wherein the separation surface set calculation device further sets maximization of a size of the unknown class region around an origin as the optimization target.

17. The separation surface set calculation apparatus according to claim 15, wherein the separation surface set calculation device further sets minimization of overlapping area where the at least one known class are overlapped to each other as the optimization target.

* * * * *